US012030499B2

(12) United States Patent
Choi

(10) Patent No.: US 12,030,499 B2
(45) Date of Patent: Jul. 9, 2024

(54) INTERSECTION IDENTIFICATION WITH RELATED DRIVING CONTROL SYSTEM AND METHOD FOR VEHICLES

(71) Applicant: HYUNDAI MOBIS CO., LTD., Seoul (KR)

(72) Inventor: Kwang Il Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 99 days.

(21) Appl. No.: 17/529,758

(22) Filed: Nov. 18, 2021

(65) Prior Publication Data

US 2022/0176966 A1 Jun. 9, 2022

(30) Foreign Application Priority Data

Dec. 3, 2020 (KR) .................. 10-2020-0167506

(51) Int. Cl.
*G06V 20/56* (2022.01)
*B60W 30/18* (2012.01)

(52) U.S. Cl.
CPC ..... *B60W 30/18159* (2020.02); *G06V 20/588* (2022.01); *B60W 2420/403* (2013.01); *B60W 2552/05* (2020.02); *B60W 2552/10* (2020.02); *B60W 2554/4041* (2020.02); *B60W 2554/4042* (2020.02); *B60W 2554/4043* (2020.02); *B60W 2554/406* (2020.02)

(58) Field of Classification Search
CPC ........ G06V 20/588; B60W 2554/4041; B60W 2554/4042; B60W 2554/406; B60W 2554/4043; B60W 2552/05; B60W 2552/10; B60W 2420/42

USPC .......................................................... 701/26
See application file for complete search history.

(56) References Cited

U.S. PATENT DOCUMENTS

| 5,402,120 A * | 3/1995 | Fujii | G01C 21/3632 |
| | | | 701/428 |
| 8,996,234 B1 * | 3/2015 | Tamari | B60W 40/09 |
| | | | 701/123 |
| 11,604,476 B1 * | 3/2023 | Leefer | H04L 67/12 |
| 2004/0227647 A1 * | 11/2004 | Yanai | G08G 1/161 |
| | | | 340/995.1 |
| 2006/0217879 A1 * | 9/2006 | Ikeuchi | G01C 21/3844 |
| | | | 701/409 |
| 2010/0185390 A1 * | 7/2010 | Monde | G01C 21/26 |
| | | | 701/532 |

(Continued)

FOREIGN PATENT DOCUMENTS

| KR | 10-2013-0130105 A | 12/2013 |
| KR | 10-1685900 B1 | 12/2016 |
| KR | 10-2020-0044193 A | 4/2020 |

*Primary Examiner* — Richard A Goldman
(74) *Attorney, Agent, or Firm* — NSIP Law

(57) ABSTRACT

Disclosed are an intersection driving control system and method for vehicles, the intersection driving control system for vehicles including a monitoring array configured to recognize and monitor peripheral vehicles driving proximate to a host vehicle, a pattern detector configured to detect reduction patterns of the peripheral vehicles in a longitudinal direction, and an intersection entry confirmer configured to confirm whether the host vehicle enters an intersection based on whether the longitudinal reduction patterns of the peripheral vehicles are similar to an intersection entry pattern.

14 Claims, 4 Drawing Sheets

(56) References Cited

U.S. PATENT DOCUMENTS

| | | | |
|---|---|---|---|
| 2010/0231718 A1* | 9/2010 | Nakamori | G06V 20/588 348/148 |
| 2011/0169626 A1* | 7/2011 | Sun | G08G 1/166 340/439 |
| 2014/0365228 A1* | 12/2014 | Ng-Thow-Hing | G06F 3/017 704/275 |
| 2015/0062168 A1* | 3/2015 | Ng-Thow-Hing | G02B 27/0101 345/633 |
| 2016/0284212 A1* | 9/2016 | Tatourian | G08G 1/096775 |
| 2016/0355181 A1* | 12/2016 | Morales Teraoka | G08G 1/166 |
| 2016/0362105 A1* | 12/2016 | Kwon | B60W 50/0097 |
| 2017/0068861 A1* | 3/2017 | Miller | G06V 20/52 |
| 2017/0103267 A1* | 4/2017 | Mishra | G06F 18/41 |
| 2017/0113512 A1* | 4/2017 | Park | G06V 40/18 |
| 2017/0124877 A1* | 5/2017 | Sim | B60Q 9/008 |
| 2017/0308761 A1* | 10/2017 | Gillet | G08G 1/165 |
| 2017/0372431 A1* | 12/2017 | Perl | G06Q 40/08 |
| 2018/0101737 A1* | 4/2018 | You | G08G 1/04 |
| 2018/0181818 A1* | 6/2018 | Shimotani | G06T 7/70 |
| 2018/0188046 A1* | 7/2018 | Akiva | G01C 21/12 |
| 2018/0354419 A1* | 12/2018 | Choi | H04N 23/80 |
| 2019/0095731 A1* | 3/2019 | Vernaza | G06F 18/214 |
| 2019/0143968 A1* | 5/2019 | Song | G08G 1/166 701/301 |
| 2019/0168732 A1* | 6/2019 | Tashiro | F02D 41/107 |
| 2019/0248279 A1* | 8/2019 | Takii | G05D 1/0088 |
| 2019/0281235 A1* | 9/2019 | Breuer | H04N 23/55 |
| 2019/0287404 A1* | 9/2019 | Vernaza | G08G 1/0145 |
| 2020/0070840 A1* | 3/2020 | Gunaratne | B60K 28/06 |
| 2020/0158515 A1* | 5/2020 | Berry | H04W 4/02 |
| 2020/0226927 A1* | 7/2020 | Iwasaki | B60W 10/18 |
| 2020/0269863 A1* | 8/2020 | Yanagi | B60W 10/18 |
| 2020/0380870 A1* | 12/2020 | Eguchi | G08G 5/0078 |
| 2020/0408534 A1* | 12/2020 | Fowe | G01C 21/32 |
| 2021/0009107 A1* | 1/2021 | Ries | G01C 21/3691 |
| 2021/0009115 A1* | 1/2021 | Ohmura | B60T 8/92 |
| 2021/0048540 A1* | 2/2021 | Miller | B60W 40/10 |
| 2021/0105619 A1* | 4/2021 | Kashani | G06F 21/32 |
| 2021/0129836 A1* | 5/2021 | Nguyen | B60W 50/0097 |
| 2021/0163001 A1* | 6/2021 | Choi | B60W 30/16 |
| 2021/0188252 A1* | 6/2021 | Lu | B60W 40/12 |
| 2021/0188261 A1* | 6/2021 | Song | B60W 50/14 |
| 2021/0191418 A1* | 6/2021 | Ohkado | G06V 20/588 |
| 2021/0197829 A1* | 7/2021 | Garnault | G06V 20/58 |
| 2021/0213935 A1* | 7/2021 | Lu | B60W 10/18 |
| 2021/0213937 A1* | 7/2021 | Imai | B60W 30/09 |
| 2021/0287024 A1* | 9/2021 | Taki | B60W 40/04 |
| 2021/0357670 A1* | 11/2021 | Wu | G06V 20/58 |
| 2022/0001899 A1* | 1/2022 | Kim | B60W 50/04 |
| 2022/0009493 A1* | 1/2022 | Mizoguchi | B60W 30/0953 |
| 2022/0118906 A1* | 4/2022 | Wang | B60Q 9/008 |
| 2022/0242337 A1* | 8/2022 | Garg | G08G 1/0112 |
| 2022/0258795 A1* | 8/2022 | Niwa | B62D 5/046 |
| 2022/0266830 A1* | 8/2022 | Cho | B60W 30/165 |
| 2022/0292846 A1* | 9/2022 | Tamura | G06V 20/588 |
| 2022/0319318 A1* | 10/2022 | Takehara | G08G 1/096844 |
| 2022/0332313 A1* | 10/2022 | Abbruzzesi | B60W 30/0956 |
| 2023/0054256 A1* | 2/2023 | Jongsma | G06T 7/66 |
| 2023/0118478 A1* | 4/2023 | Rajanna | B60W 50/14 701/24 |

* cited by examiner

INTERSECTION IDENTIFICATION WITH RELATED DRIVING CONTROL SYSTEM AND METHOD FOR VEHICLES

CROSS-REFERENCE TO RELATED APPLICATION

This application claims the benefit under 35 USC § 119(a) of Korean Patent Application No. 10-2020-0167506, filed on Dec. 3, 2020, in the Korean Intellectual Property Office, the entire disclosure of which is incorporated herein by reference for all purposes.

BACKGROUND

1. Field

The following description relates to technology in which a vehicle autonomously drives at an intersection.

2. Description of Related Art

Recently, vehicles using advanced driver assistance systems (ADASs) or autonomous driving technology tend to gradually increase in number, and in this case, efforts to perform more accurate and stable autonomous driving when vehicles drive at intersections are being made.

At an intersection, there are many cases in which traffic lanes disappear or it is difficult to recognize the display state thereof and may cause high probability of erroneously controlling vehicles, and thus, an approach method different from autonomous driving on general roads is required.

The above information disclosed in the Background section is only for enhancement of understanding of the background of the invention and should not be interpreted as conventional technology that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an intersection driving control system including a monitoring array configured to recognize and monitor peripheral vehicles driving proximate to a host vehicle, a pattern detector configured to detect reduction patterns of the peripheral vehicles in a longitudinal direction, and an intersection entry confirmer configured to confirm whether the host vehicle enters an intersection based on whether the longitudinal reduction patterns of the peripheral vehicles are determined similar to an intersection entry pattern.

The monitoring array may be configured to monitor speeds of the respective peripheral vehicles driving in front of the host vehicle in a lane in which the host vehicle drives and other lanes adjacent to the lane of the host vehicle.

The intersection driving control system may include a navigation system configured to confirm a current position of the host vehicle on a map, wherein the navigation system may determine whether the host vehicle enters the intersection, and the intersection entry confirmer verifies whether the host vehicle enters the intersection.

The monitoring array may include a camera configured to capture images surroundings the host vehicle, and the monitoring array may be configured to confirm that the host vehicle enters the intersection using images of intersection identifiers acquired through the camera.

The pattern detector and the intersection entry confirmer may include a deep learning module configured to determine whether the host vehicle enters the intersection based on movement of the peripheral vehicles observed through the monitoring array.

The intersection driving control system may include an erroneous control preventer configured to reduce reliability on signals with respect to lanes acquired by a camera of the host vehicle, in response to the intersection entry confirmer confirming that the host vehicle enters the intersection.

The intersection driving control system may include an intersecting point information calculator configured to calculate positions of intersecting points and a number of the intersecting points based on lane continuity characteristics and lane intersection characteristics in an intersection area, a driving path calculator configured to calculate at least one vehicle driving path in the intersection area based on the positions and the number of the intersecting points, and a vehicle driving controller configured to control the host vehicle to track the at least one vehicle driving path.

In another general aspect, there is provided a processor-implemented intersection driving control method for a vehicle including monitoring movement of peripheral vehicles driving proximate to a host vehicle, detecting reduction patterns of the peripheral vehicles in a longitudinal direction, and determining whether the host vehicle enters an intersection based on whether the longitudinal reduction patterns of the peripheral vehicles are determined similar to an intersection entry pattern.

The monitoring of the movement of the peripheral vehicles may include monitoring speeds of the respective peripheral vehicles driving in front of the host vehicle in a lane in which the host vehicle drives and other lanes adjacent to the lane of the host vehicle.

The intersection driving control method may include detecting, using a navigation system, whether host vehicle enters the intersection based on a current position of the host vehicle on a map.

The intersection driving control method may include confirming, using a camera of the host vehicle to capture images surroundings the host vehicle, whether the host vehicle enters the intersection based on images of intersection identifiers from among the captured images.

The determining of whether the host vehicle enters the intersection may include determining, using deep learning based, whether the host vehicle enters the intersection based on the movement of the peripheral vehicles.

The intersection driving control method may include reducing a reliability of signals with respect to lanes acquired by the camera of the host vehicle, in response to the host vehicle entering the intersection.

The intersection driving control method may include calculating positions of intersecting points and a number of the intersecting points based on lane continuity characteristics and lane intersection characteristics in an intersection area, calculating at least one vehicle driving path in the intersection area based on the positions and the number of the intersecting points, and controlling the host vehicle to track the at least one calculated vehicle driving path.

Other features and aspects will be apparent from the following detailed description, the drawings, and the claims.

Figure 1:
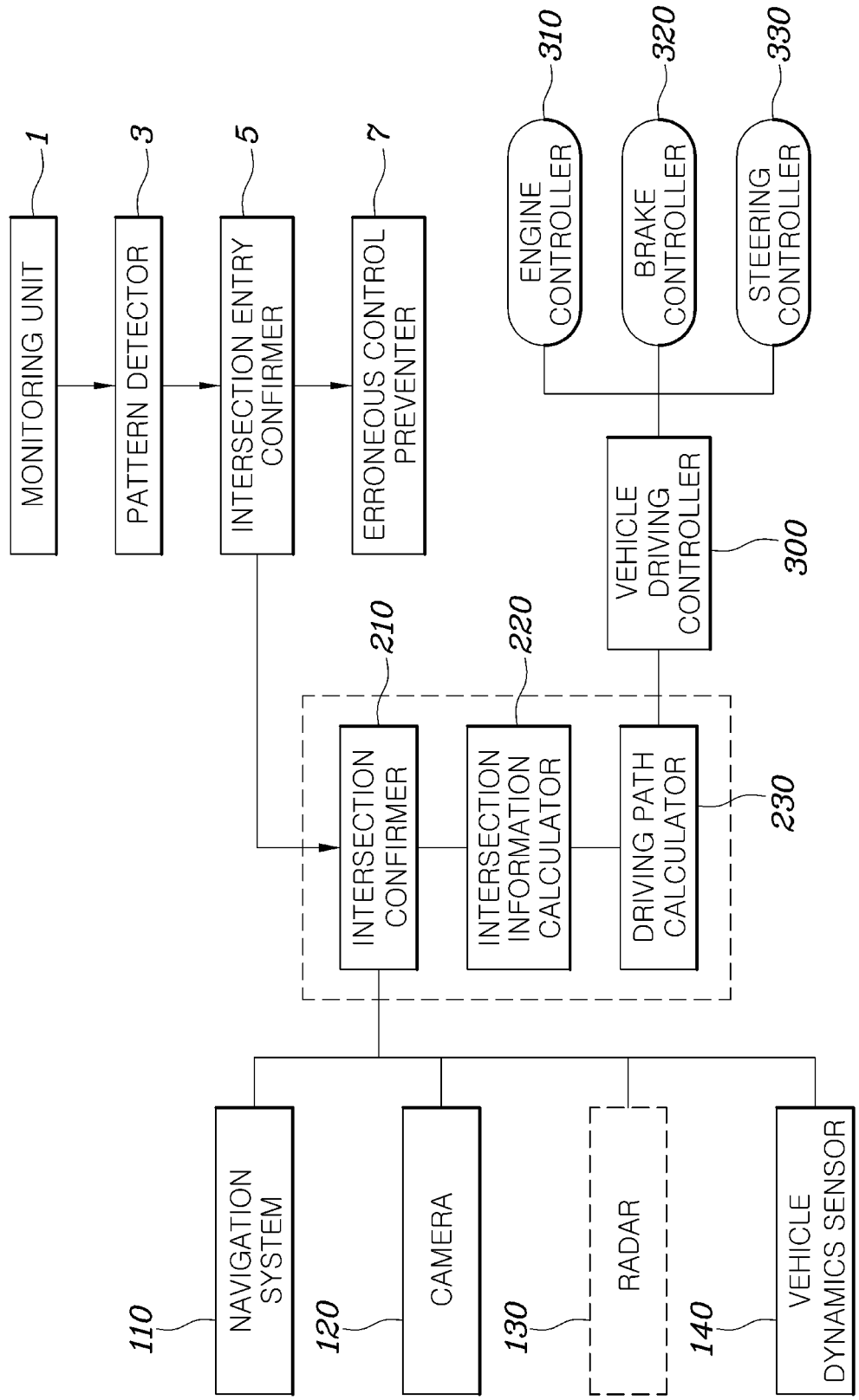
FIG. 1 is a block diagram illustrating the configuration of an intersection driving control system for vehicles according to the present invention.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements. Other words used to describe relationships between elements should be interpreted in a like fashion, e.g., "between" versus "directly between," "adjacent" versus "directly adjacent," etc.

Hereinafter, reference will be made in detail to the preferred embodiments of the present invention, examples of which are illustrated in the accompanying drawings. Some parts in one embodiment, which may be substantially the same or like those in other embodiments, are denoted by the same reference numerals even though they are depicted in different drawings.

Figure 2:
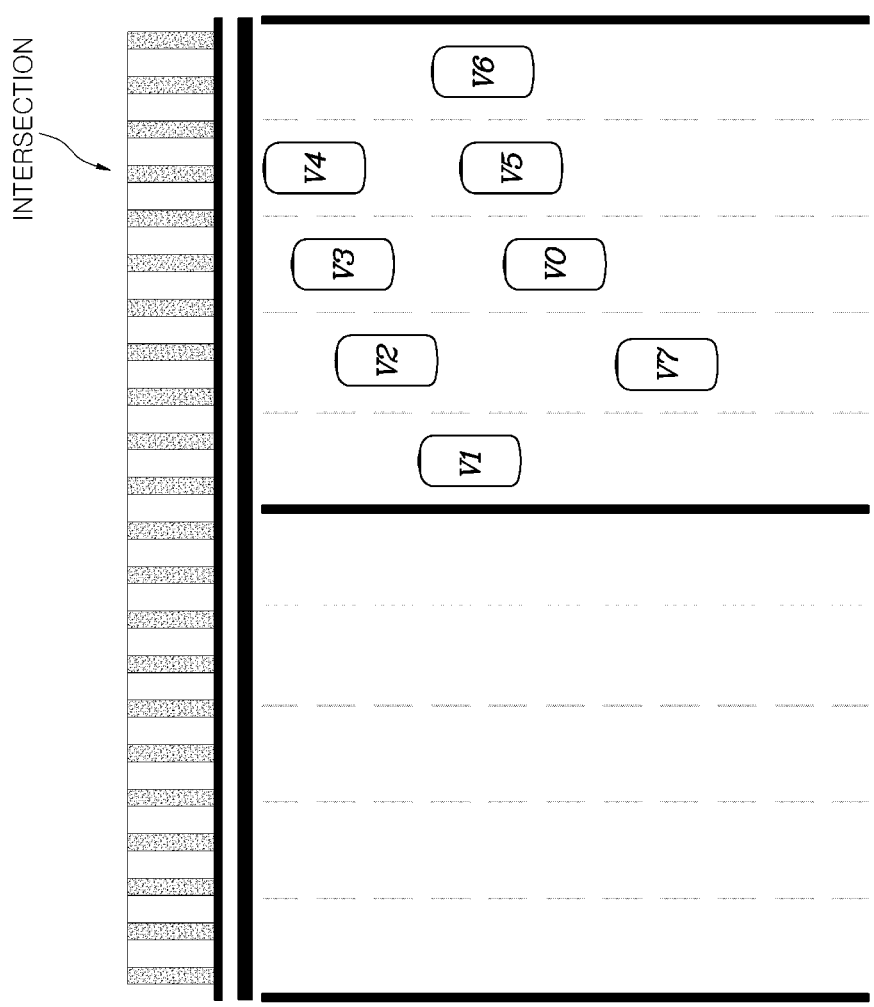
FIG. 2 is a view illustrating an intersection driving control method for vehicles according to the present invention.

Referring to FIGS. 1 and 2, an intersection driving control system for vehicles according to the present invention includes a monitoring unit 1 (may also be referred to as a monitoring array 1) configured to recognize and monitor a plurality of peripheral vehicles V1, V2, V3, V4, V5 and V6 driving around a host vehicle V0, a pattern detector 3 configured to detect reduction patterns of the monitored peripheral vehicles V1, V2, V3, V4, V5 and V6 in the longitudinal direction, and an intersection entry confirmer 5 configured to confirm whether or not the host vehicle V0 is in a situation in which the host vehicle V0 enters an intersection by determining whether or not the longitudinal reduction patterns of the peripheral vehicles V1, V2, V3, V4, V5 and V6 detected by the pattern detector 3 are similar to an intersection entry pattern.

That is, in the present invention, the host vehicle V0 may monitor the peripheral vehicles V1, V2, V3, V4, V5 and V6 around the host vehicle V0 during driving, may detect the reduction patterns of the peripheral vehicles V1, V2, V3, V4, V5 and V6 in the longitudinal direction, and may confirm whether or not the host vehicle V0 is in the situation in which the host vehicle V0 enters the intersection together with the peripheral vehicles V1, V2, V3, V4, V5 and V6 by determining whether or not the longitudinal reduction patterns of the peripheral vehicles V1, V2, V3, V4, V5 and V6 are similar to the predetermined intersection entry pattern.

The monitoring unit 1 is configured to monitor the speeds of the respective peripheral vehicles V1, V2, V3, V4, V5 and V6 driving in front of the host vehicle V0 in a lane in which the host vehicle V0 drives and other lanes adjacent to the lane.

That is, as shown in FIG. 2, there are seven vehicles V1 to V7 driving other than the host vehicle V0, to which the present invention is applied, and thereamong, the speeds of only the vehicles V1 to V6 driving in front of the host vehicle V0 other than the vehicle V7 driving behind the host vehicle V0 are monitored.

The reason for this is that there is a high probability that the vehicle V7 driving behind the host vehicle V0, to which the present invention is applied, arrives at the intersection later than the host vehicle V0, and thus, it is difficult to proactively confirm whether or not the host vehicle V0, to which the present invention is applied, enters the intersection using the longitudinal reduction pattern of the vehicle V7.

The intersection driving control system for vehicles according to the present invention may further include a navigation system 110 configured to confirm the current position of the host vehicle V0 on a map, and an intersection confirmer 210 may detect a situation in which the host vehicle V0 enters the intersection through the navigation system 110, and may additionally confirm the situation in which the host vehicle V0 enters the intersection using the results of the intersection entry confirmer 5.

That is, it is not determined whether or not the host vehicle V0 enters the intersection only by the intersection entry confirmer 5 or only through the navigation system 110, and the intersection confirmer 210 may first detect a situation in which the host vehicle V0 enters the neighborhood of the intersection through the navigation system 110, and then, in this state, the intersection entry confirmer 5 may additionally confirm the situation in which the host vehicle V0 enters the intersection.

Therefore, the navigation system 110 may be configured to confirm that the host vehicle V0 is moving towards the intersection on the map by mounting a global positioning system (GPS) system in the navigation system 110 or interworking with the GPS system.

Further, the monitoring unit 1 includes a camera configured to image the surroundings of the host vehicle V0, and may be configured to additionally confirm that the host vehicle enters the intersection using images of intersection identifiers acquired through the camera.

Here, the intersection identifiers may be traffic equipment, such as traffic lights or traffic guide sign boards.

That is, when the camera additionally captures the images of the intersection identifiers in the state in which the navigation system 100 and the intersection entry confirmer 5 confirms the situation in which the host vehicle V0 enters the intersection, the situation in which the host vehicle V0 enters the intersection may be more firmly determined, and further, information, such as an actual distance from the host vehicle V0 to an entry position of the intersection, may be more firmly confirmed.

Here, the pattern detector 3 and the intersection entry confirmer 5 may include a deep learning module configured to determine whether or not the host vehicle V0 is in the situation in which the host vehicle V0 enters the intersection based on to movement of other peripheral vehicles input through the monitoring unit 1.

That is, the deep learning module may store an intersection entry pattern acquired by learning big data, about various situations in which vehicles enter the intersection, in advance, and may confirm whether or not a current situation coincides with any one of the situations in which vehicles enter the intersection by receiving movement of the peripheral vehicles input through the monitoring unit 1.

The intersection entry pattern may be set to a pattern in which peripheral vehicles perform almost the same reduction in the longitudinal direction at almost the same position or in almost the same section, when the pattern detector 3 and the intersection entry confirmer 5 do not include the deep learning module.

That is, when the peripheral vehicles perform almost the same reduction in the longitudinal direction at almost the same position or in almost the same section on a road, the vehicles often enter the intersection, and thus, the intersection entry pattern is used to determine such a situation.

The intersection driving control system for vehicles according to the present invention may further include an erroneous control preventer 7 configured to reduce reliability on signals with respect to lanes acquired by the camera of the host vehicle V0 so as to prevent erroneous control, when the intersection entry confirmer 5 confirms that the host vehicle V0 enters the intersection.

Since lanes may disappear or overlap each other at intersections and thus it may be difficult recognize the display states of the lanes at the intersection, when lane information acquired through the camera is excessively trusted, there is a high possibility that autonomous driving of the host vehicle V0 is erroneously controlled, and thus, the erroneous control preventer 7 serves to prevent such erroneous control.

The intersection driving control system for vehicles according to the present invention may further include the following elements so as to prevent erroneous control, as described above.

That is, the intersection driving control system for vehicles according to the present invention may further include an intersecting point information calculator 220 configured to calculate the positions of a plurality of intersecting points and the number of the intersecting points based on lane continuity characteristics and lane intersection characteristics in an intersection area, a driving path calculator 230 configured to calculate at least one vehicle driving path in the intersection area based on the positions and the number of the intersecting points, and a vehicle driving controller 300 configured to control the host vehicle V0 so as to track the at least one vehicle driving path calculated by the driving path calculator 230.

The above-described additional elements are disclosed in Korean Patent Registration No. 10-2132899 (Unexamined Publication No. KR 1020200044193 A), and are configured such that the intersecting point information calculator 220 calculates a plurality of intersecting points in an intersection, the driving path calculator 230 calculates a vehicle driving path along which the host vehicle V0 may pass through the intersection based on the calculated intersecting points, and the vehicle driving controller 300 controls the host vehicle V0 so as to track the vehicle driving path.

Figure 3:
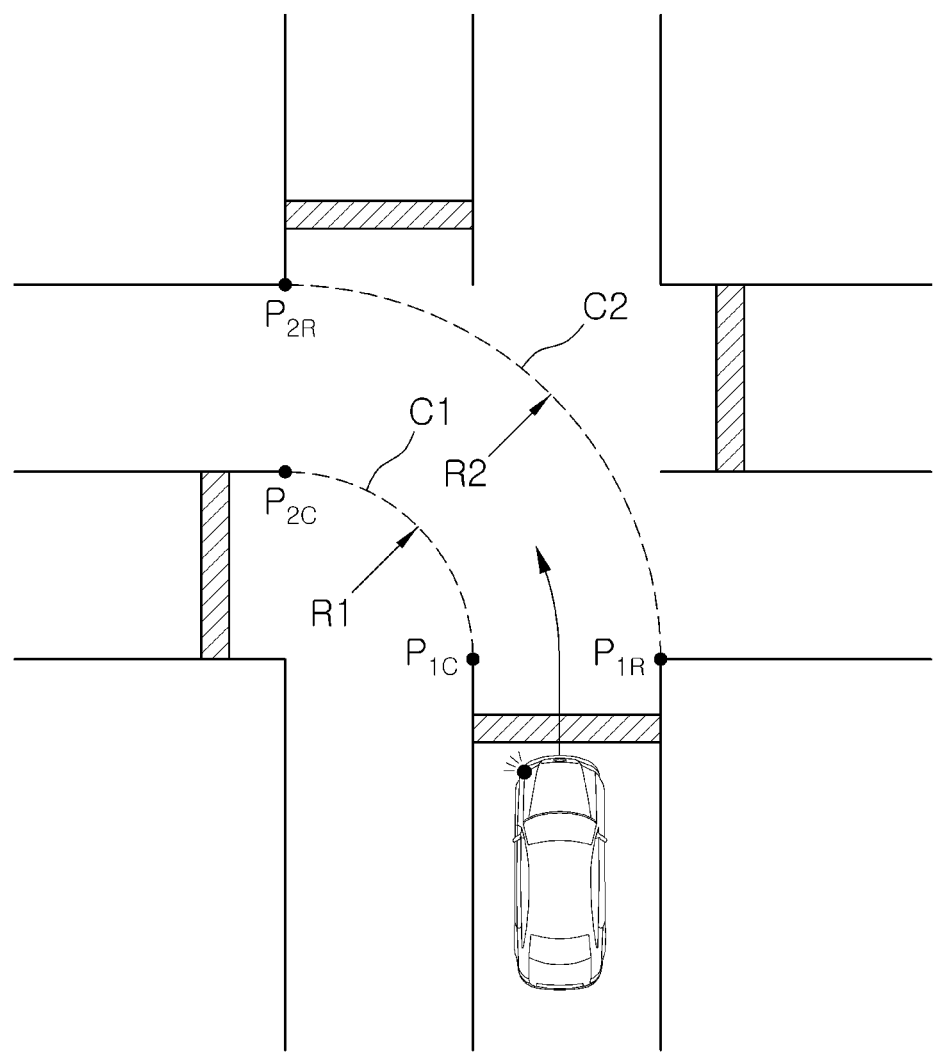
FIG. 3 is a view exemplarily illustrating a process for calculating a vehicle driving path along which a vehicle will turn left at an intersection.

FIG. 3 illustrates a process for calculating the vehicle driving path along which the host vehicle V0 will turn left at an intersection through the above-described additional elements, and in this case, the vehicle driving path may be determined as a curved path between lines C1 and C2, and the lines C1 and C2 may be determined by radiuses R1 and R2 using intersecting points $P_{1C}$, $P_{2C}$, $P_{1R}$ and $P_{2R}$ calculated at the intersection.

For reference, although FIG. 1 shows that the vehicle driving controller 300 drives an engine controller 310, a brake controller 320 and a steering controller 330 of the host vehicle V0, when the host vehicle V0 is an electric vehicle, a motor controller or the like may be substituted for the engine controller 310.

Further, FIG. 1 shows that the intersection confirmer 210 may additionally receive inputs from a camera 120, a radar 130 and a vehicle dynamics sensor 140, and in this case, the camera 120 may be the same as the camera of the monitoring unit 1 or be provided separately from the camera of the monitoring unit 1.

Figure 4:
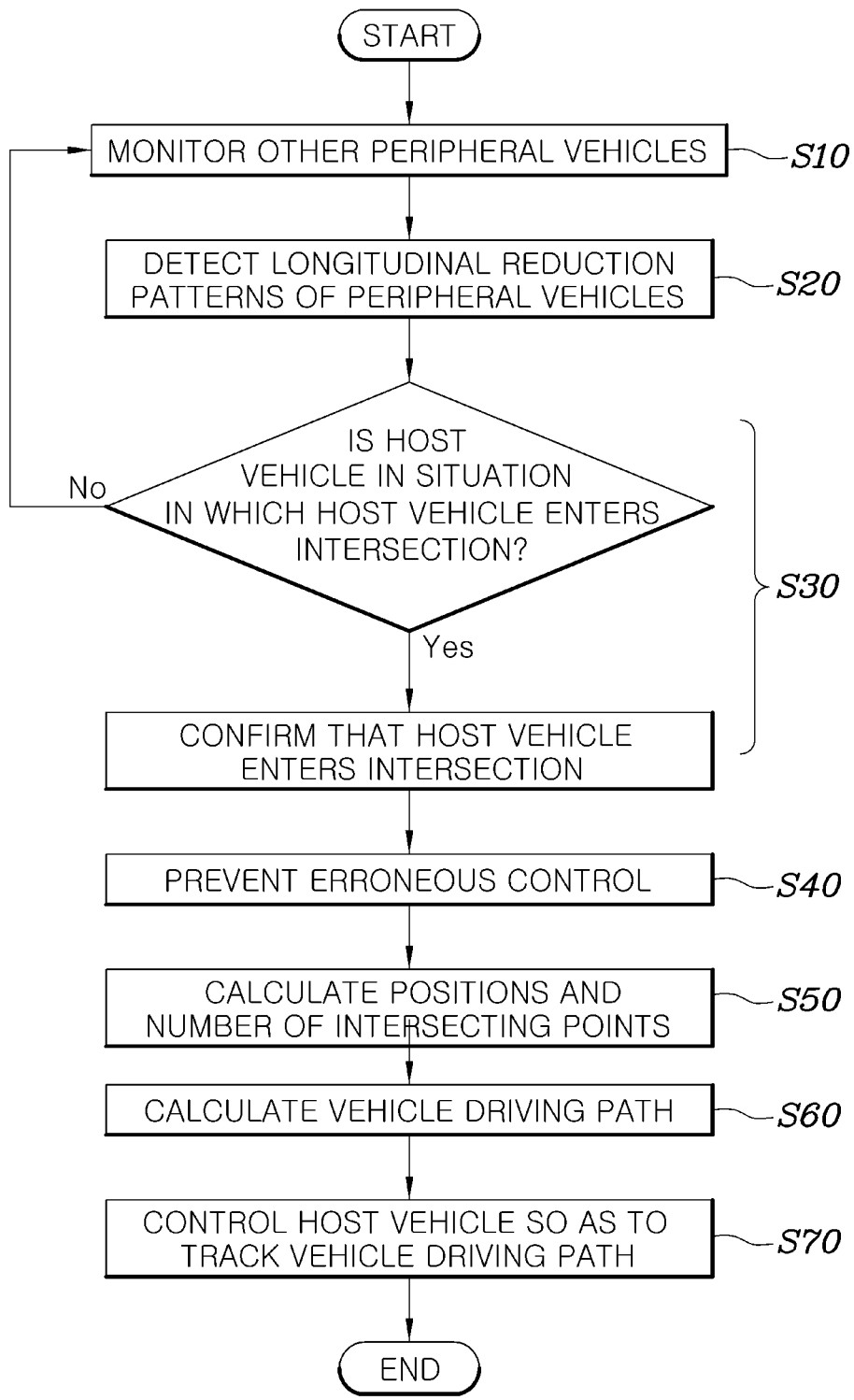
FIG. 4 is a flowchart illustrating an intersection driving control method for vehicles according to one embodiment of the present invention.

Referring to FIG. 4, an intersection driving control method for vehicles according to the present invention includes monitoring movement of a plurality of peripheral vehicles driving around a host vehicle (S10), detecting reduction patterns of the monitored peripheral vehicles in the longitudinal direction (S20), and confirming whether or not the host vehicle is in a situation in which the host vehicle enters an intersection by determining whether or not the longitudinal reduction patterns of the peripheral vehicles are similar to an intersection entry pattern (S30).

In monitoring of movement of the peripheral vehicles driving around the host vehicle (S10), the speeds of the respective peripheral vehicles driving in front of the host vehicle V0 in a lane in which the host vehicle V0 drives and other lanes adjacent to the lane may be monitored.

A navigation system 110 configured to confirm the current position of the host vehicle V0 on a map may detect the situation in which the host vehicle V0 enters the intersection and, in confirmation as to whether or not the host vehicle is in the situation in which the host vehicle enters the intersection (S30), the situation in which the host vehicle V0 enters the intersection may be additionally confirmed.

Here, the situation in which the host vehicle V0 enters the intersection may be additionally confirmed by allowing a camera of the host vehicle configured to image the surroundings in front of the host vehicle to capture the images of intersection identifiers.

Whether or not the host vehicle is in the situation in which the host vehicle enters the intersection may be determined using deep learning based on movement of the peripheral vehicles input in monitoring of movement of the peripheral vehicles driving around the host vehicle (S10).

When it is confirmed that the vehicle enters the intersection, reliability on signals with respect to lanes acquired by the camera of the host vehicle may be reduced so as to prevent erroneous control of the host vehicle (S40).

Further, the intersection driving control method for vehicles according to the present invention may further include calculating the positions of a plurality of intersecting points and the number of the intersecting points based on lane continuity characteristics and lane intersection characteristics in an intersection area (S50), calculating at least one vehicle driving path in the intersection area based on the positions and the number of the intersecting points (S60), and controlling the host vehicle so as to track the at least one calculated vehicle driving path (S70).

As is apparent from the above description, an intersection driving control system and method for vehicles according to the present invention, when a vehicle approaches an intersection, may enable the vehicle to more accurately recognize and confirm in advance that the vehicle enters the intersection, may improve accuracy on a path along which the vehicle is movable in an intersection area based on results of confirmation so as to improve safety and reliability of the vehicle through safer and more accurate driving at the intersection, and may thus ultimately improve the commercial value of the vehicle.

As described above, provided are intersection driving control system and method for vehicles which, when a vehicle approaches an intersection, may enable the vehicle to more accurately recognize and confirm in advance that the vehicle enters the intersection, may improve accuracy on a path along which the vehicle is movable in an intersection area based on results of confirmation so as to improve safety and reliability of the vehicle through safer and more accurate driving at the intersection, and may thus ultimately improve the commercial value of the vehicle.

The monitoring array, pattern detector, intersection entry confirmer, erroneous control preventer, intersecting point information calculator, driving path calculator, vehicle driving controller, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An intersection driving control system for a vehicle, the system comprising:
   a monitoring array configured to recognize and monitor peripheral vehicles proximate to a host vehicle;
   a pattern detector configured to detect reduction patterns of the peripheral vehicles in a longitudinal direction;
   an intersection entry confirmer configured to:
      compare the reduction patterns of the peripheral vehicles in the longitudinal direction with an intersection entry pattern; and
      confirm entry of the host vehicle at an intersection based on the comparison of the reduction patterns of the peripheral vehicles with the intersection entry pattern; and
   a vehicle driving controller configured to control movement of the host vehicle at the intersection based on information provided by the monitoring array, the pattern detector, and the intersection entry confirmer.

2. The system of claim 1, wherein the monitoring array is further configured to:
   respectively monitor speeds of the peripheral vehicles that are being driven in front of the host vehicle in a lane in which the host vehicle is being driven; and
   respectively monitor speeds of the peripheral vehicles that are being driven in one or more lanes that are adjacent to the lane in which the host vehicle is being driven.

3. The system of claim 1, further comprising:
   a navigation system configured to:
      confirm a current position of the host vehicle on a map; and
      determine entry of the host vehicle at the intersection,
   wherein the intersection entry confirmer is further configured to verify entry of the host vehicle at the intersection.

4. The system of claim 3,
   wherein the monitoring array comprises a camera configured to capture images of surroundings of the host vehicle; and
   wherein the monitoring array is further configured to confirm entry of the host vehicle at the intersection based on intersection identifiers acquired through the camera.

5. The system of claim 1, further comprising a deep learning module,
   wherein the deep learning module is configured to be utilized by the pattern detector and the intersection entry confirmer to determine entry of the host vehicle at the intersection based on movement of the peripheral vehicles observed through the monitoring array.

6. The system of claim 1,
   wherein the monitoring array comprises a camera, and
   wherein the system further comprises an erroneous control preventer configured to reduce reliability on signals with respect to lanes acquired by a camera of the host vehicle, in response to the intersection entry confirmer confirming entry of the host vehicle at the intersection.

7. The system of claim 1, further comprising:
an intersecting point information calculator configured to calculate positions of intersecting points and a number of the intersecting points based on lane continuity characteristics and lane intersection characteristics in an intersection area;
a driving path calculator configured to calculate at least one vehicle driving path in the intersection area based on the positions and the number of the intersecting points; and
a vehicle driving controller configured to control the host vehicle to track the at least one vehicle driving path.

8. A processor-implemented intersection driving control method for a vehicle, the method comprising:
monitoring movement of peripheral vehicles driving proximate to a host vehicle;
detecting reduction patterns of the peripheral vehicles in a longitudinal direction;
comparing the reduction patterns of the peripheral vehicles in the longitudinal direction with an intersection entry pattern;
confirming entry of the host vehicle at an intersection based on the comparison of the reduction patterns of the peripheral vehicles with the intersection entry pattern; and
controlling movement of the host vehicle at the intersection based on information derived from the monitoring of the movement of the peripheral vehicles, the detecting of the reduction patterns, the comparing of the reduction patterns, and the confirming of the entry of the host vehicle at the intersection.

9. The method of claim 8, wherein the monitoring of the movement of the peripheral vehicles comprises:
respectively monitoring speeds of the peripheral vehicles that are being driven in front of the host vehicle in a lane in which the host vehicle is being driven; and
respectively monitoring speeds of the peripheral vehicles that are being driven in one or more lanes that are adjacent to the lane in which the host vehicle is being driven.

10. The method of claim 8, further comprising:
detecting, using a navigation system, entry of the host vehicle at the intersection based on a current position of the host vehicle on a map.

11. The method of claim 10, further comprising:
confirming, using a camera of the host vehicle to capture images surroundings the host vehicle, whether the host vehicle enters the intersection based on images of intersection identifiers from among the captured images.

12. The method of claim 8, wherein the determining of whether the host vehicle enters the intersection comprises determining, using deep learning based, whether the host vehicle enters the intersection based on the movement of the peripheral vehicles.

13. The method of claim 8, further comprising reducing a reliability of signals with respect to lanes acquired by the camera of the host vehicle, in response to the host vehicle entering the intersection.

14. The method of claim 8, further comprising:
calculating positions of intersecting points and a number of the intersecting points based on lane continuity characteristics and lane intersection characteristics in an intersection area;
calculating at least one vehicle driving path in the intersection area based on the positions and the number of the intersecting points; and
controlling the host vehicle to track the at least one calculated vehicle driving path.

* * * * *